United States Patent [19]

Berkey et al.

[11] Patent Number: 4,950,047
[45] Date of Patent: Aug. 21, 1990

[54] METHOD OF COATING OPTICAL FIBERS

[75] Inventors: George E. Berkey, Pine City; Robert M. Hawk, Bath, both of N.Y.

[73] Assignee: Corning Incorporated, Corning, N.Y.

[21] Appl. No.: 361,385

[22] Filed: Jun. 5, 1989

[51] Int. Cl.⁵ .............................................. G02B 6/44
[52] U.S. Cl. .................... 350/96.23; 350/96.33
[58] Field of Search ...................... 350/96.22–96.25, 350/96.27, 96.29, 96.3, 96.33, 96.34

[56] References Cited

U.S. PATENT DOCUMENTS

| 4,669,814 | 6/1987 | Dyott | 350/96.29 X |
| 4,712,866 | 12/1987 | Dyott | 350/96.3 |
| 4,741,594 | 5/1988 | Suzuki | 350/96.23 |

FOREIGN PATENT DOCUMENTS

| 62-134608 | 6/1987 | Japan | 350/96.3 |
| 62-299914 | 12/1987 | Japan | 350/96.3 |
| 63-208809 | 8/1988 | Japan | 350/96.3 |

Primary Examiner—John D. Lee
Assistant Examiner—John Ngo
Attorney, Agent, or Firm—William J. Simmons, Jr.

[57] ABSTRACT

This invention relates to a method of drawing twist-free optical fibers; it is particularly useful for drawing polarization retaining single-mode optical fibers having azimuthal inhomogeneities. There is applied to the fiber, during the drawing thereof, a coating having a non-circular cross-section, the azimuthal inhomogeneity of the fiber being positioned in a substantially constant orientation with respect to the non-circular cross-section of the coating. In another embodiment, a plurality of fibers having azimuthal inhomogeneities are drawn from a plurality of preforms that are properly oriented in the draw furnace. The fibers are drawn through the same coater so that the azimuthal inhomogeneity of each fiber is oriented in a substantially constant relationship with respect to the azimuthal inhomogeneities of the remaining fibers in the coating.

13 Claims, 2 Drawing Sheets

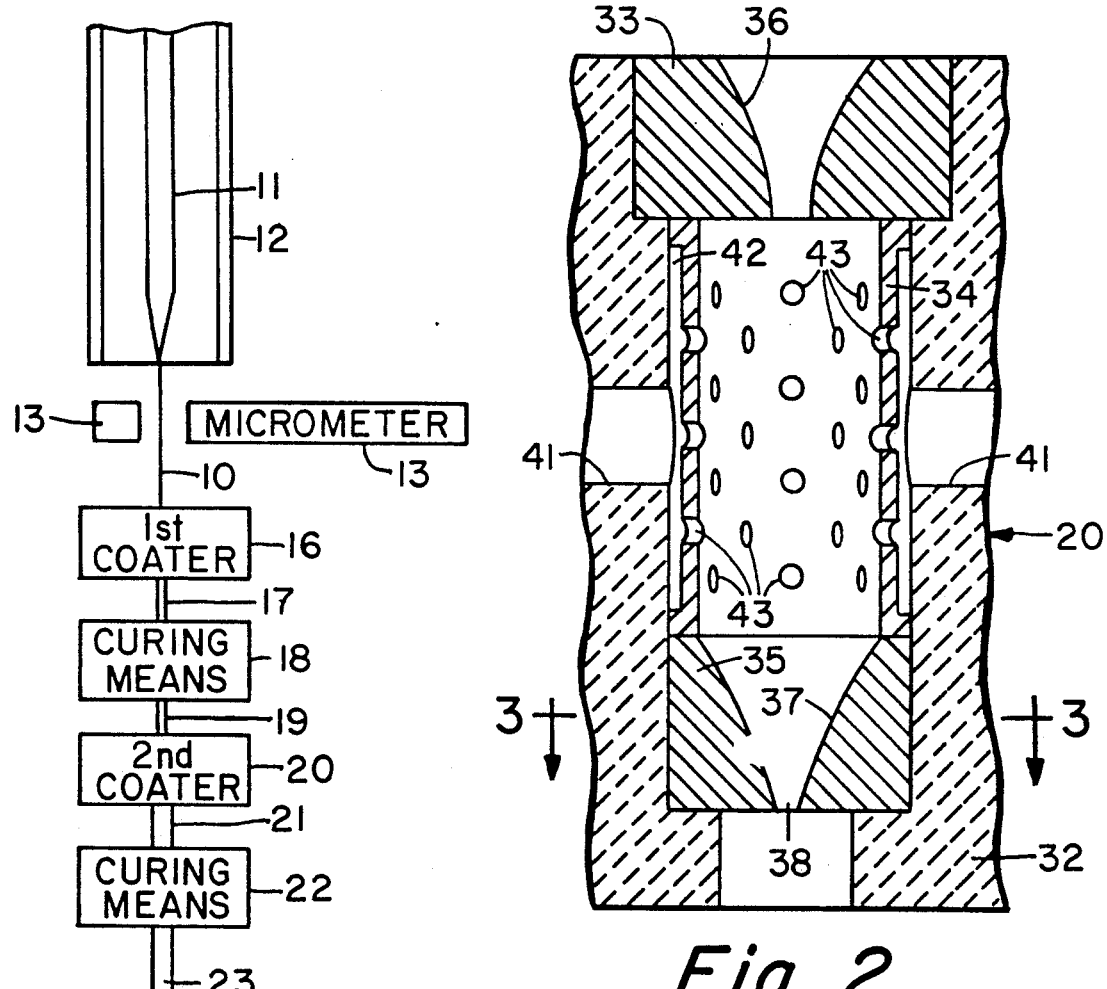
Fig. 2
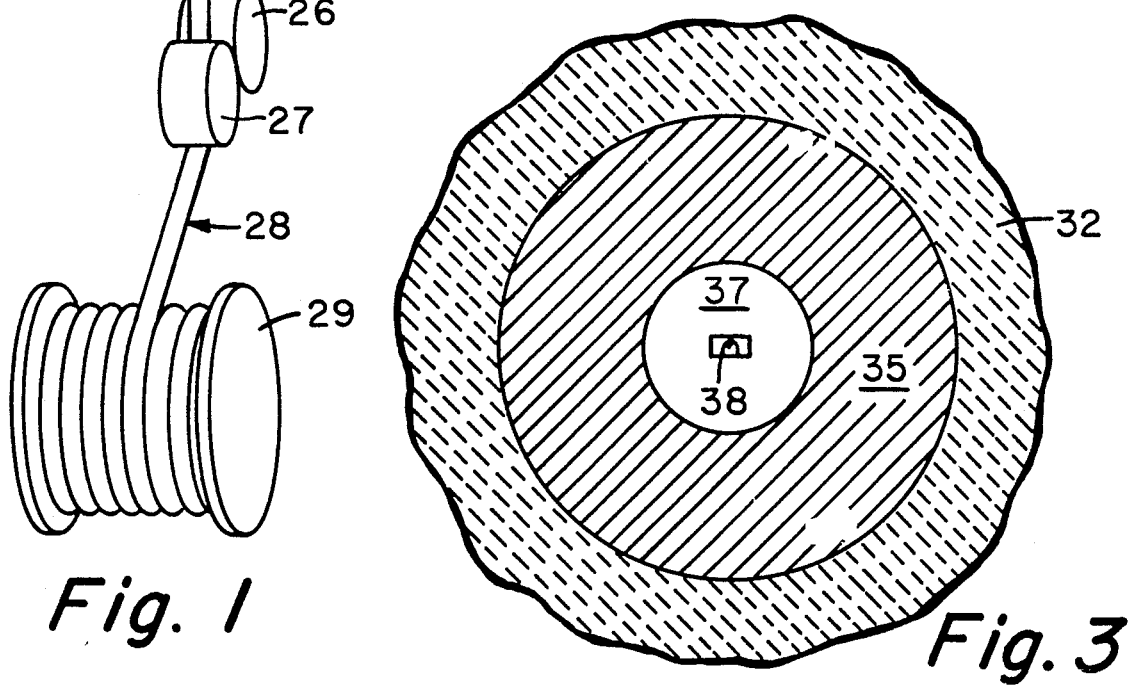
Fig. 1
Fig. 3

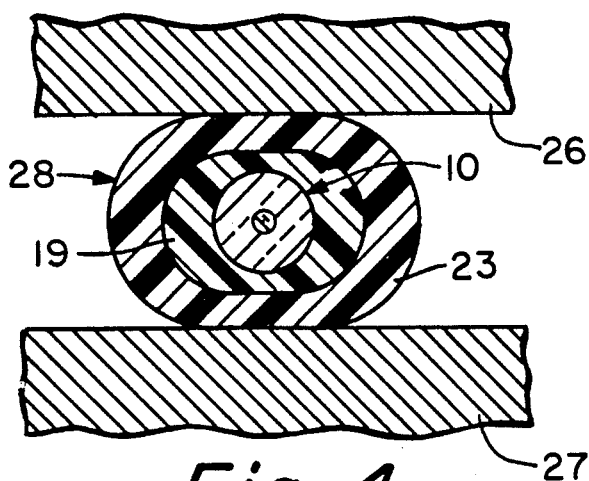
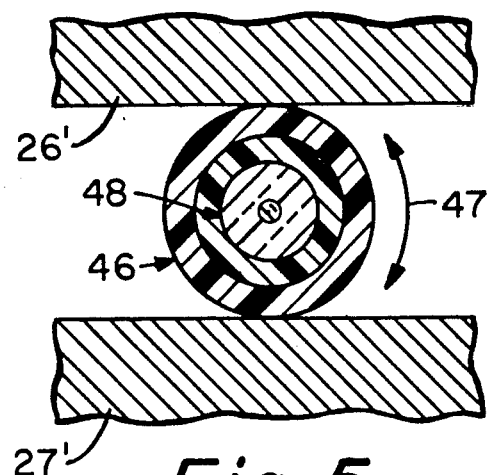
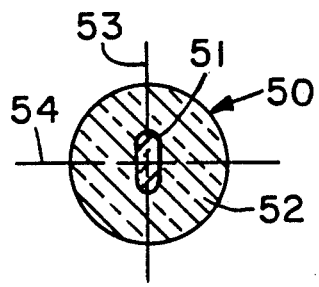
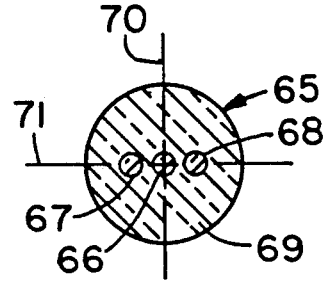
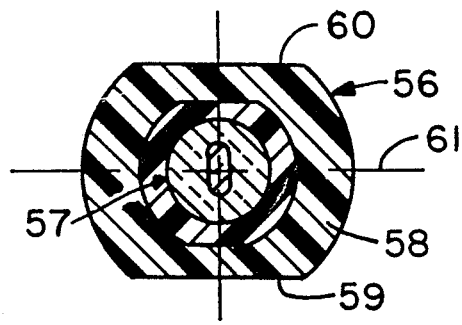
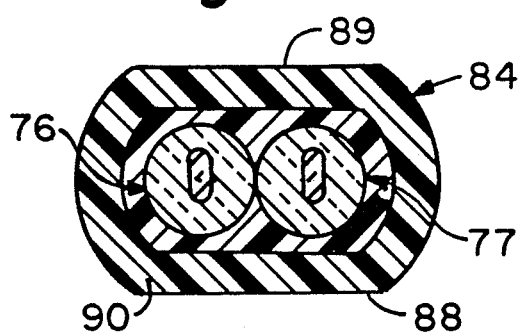
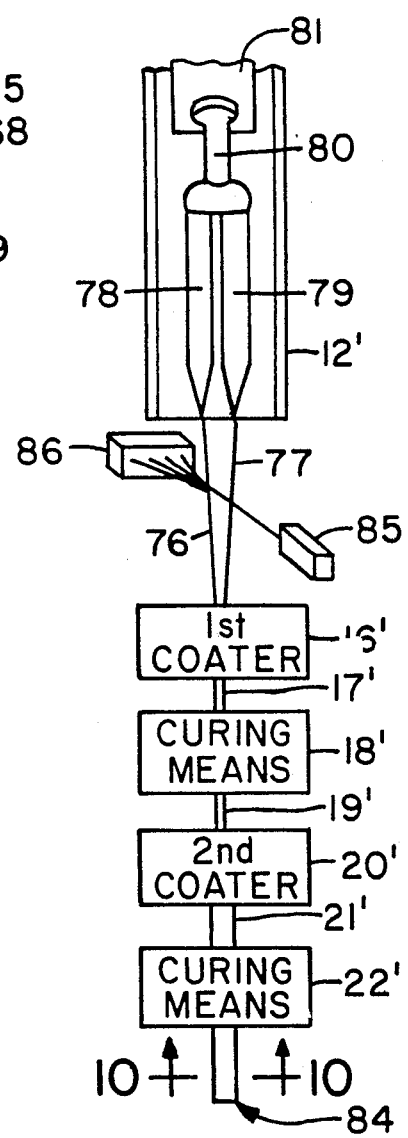

METHOD OF COATING OPTICAL FIBERS

CROSS-REFERENCE TO RELATED APPLICATION

This patent application is related to our copending U.S. patent application Ser. No. 361,383(now U.S. Pat. No. 4,932,740) entitled "Method of Making Polarization Retaining Optical Fiber Coupler" (Berkey et al. filed on even date herewith.

BACKGROUND OF THE INVENTION

The present invention relates generally to the field of applying coatings to optical fibers during the drawing thereof. More particularly, the invention relates to a method of coating optical fibers in such a manner as to prevent twisting of such fibers and/or to facilitate the proper alignment of such fibers.

It has been known that coupling occurs between two closely spaced cores in a multiple core device. The coupling efficiency increases with decreasing core separation and, in the case of single-mode cores, with decreasing core diameter. Fiber optic couplers employed in systems such as fiber optic gyroscopes must be capable of preserving the polarization of optical signals propagated therethrough. Such couplers are preferably made from single-mode fibers which are capable of preserving the polarization of signals along two different, usually orthogonal axes. Polarization retaining single-mode (PRSM) fiber optic couplers are disclosed in U.S. Pat. Nos. 4,589,725 and 4,755,021 issued to R. B. Dyott and U.S. Pat. No. 4,753,497 issued to Y. Fujii et al. The couplers taught in these patents comprise PRSM fibers of the type wherein the core is surrounded by an elliptically-shaped cladding layer which imparts a stress to the core.

U.S. Pat. No. 4,755,021 teaches that a PRSM fiber having two intersecting flat surfaces can be drawn from a similarly shaped preform. The preform can be made by first forming a cylindrical preform with an elliptical core and cladding located in the center thereof and then grinding two adjacent sides of the preform to form a cross-section having one flat surface parallel to the major axis of the elliptical core and another flat surface parallel to the minor axis of the elliptical core. Two or more of the fibers produced from such a preform can be etched along those portions of their lengths where it is desired to couple the fields of the two fibers. The etched fibers are fed, with their flat sides facing each other, through a glass tube which is then heated until the central region thereof collapses onto the fibers. The etching and the subsequent handling of the etched fibers is a tedious process. Moreover, the cross-sectional shape of these fibers makes it difficult to connect them to conventional single-mode fibers having axial cores.

In U.S. Pat. No. 4,753,497 a circular PRSM fiber is bonded in a channel with the major axis of the elliptical cladding either perpendicular to or parallel to the channel surface. The substrate in which the channel is located and the PRSM fiber embedded therein are then abraided away to a depth sufficient to permit light traveling in the core to escape from the fiber. To form a coupler, two similarly formed substrates are combined with index matching fluid interposed therebetween. Connection of the coupler fibers to the other system fibers is facilitated by the use of circular PRSM fibers. However, to ensure proper functioning fo such a coupler, the technician forming the coupler must know the orientation of the major axes of the PRSM fibers so that they can be positioned in suitable alignment. It is sometimes extremely difficult to determine the relative orientation of a circular PRSM fiber from a transverse observation thereof.

SUMMARY OF THE INVENTION

It is therefore an object of the present invention to provide a method fo drawing untwisted optical fibers. Another object is to provide a method of forming optical fibers having a coating, a characteristic of which is indicative of an azimuthal orientation of the fiber. Yet another object is to provide a method of forming a plurality of optical fibers the azimuthal orientations of which are held in proper alignment. A further object is to provide novel coated optical fibers produced by these methods.

One aspect of the present invention relates to a method of forming an optical fiber cable that is substantially twist-free along the length thereof. The method comprises the steps of providing at least one source of softened thermoplastic material such as glass or plastic from which at least one optical fiber can be drawn. If two or more fibers are simultaneously drawn, they are pulled from a plurality of sources. At least one optical fiber is pulled from the source by passing it through a draw mechanism having opposed, moving surfaces. There is applied to the fiber, between the source and draw mechanism, a coating having at least one surface that is sufficiently flat that the coating cannot twist in the draw mechanism. In one embodiment, there is applied to the fiber a coating having two opposed flat surfaces. The step of applying may comprise applying a plurality of layers of coating material, each subsequently applied layer being applied over the surface of the previous one. One or more of the initially applied coating layers may be round.

The source or sources may comprise softened thermoplastic material from which there can be drawn at least one PRSM fiber having an azimuthal inhomogeneity which is oriented in a substantially constant relationship with respect to the flat surface of the coating.

In an embodiment wherein a plurality of PRSM fibers are simultaneously drawn, each fiber having an azimuthal inhomogeneity, the inhomogeneity of each fiber in the coating is oriented in a substantially constant relationship with respect to the inhomogeneities of the remaining fibers.

Another embodiment relates to a method of drawing an optical fiber comprising the steps of drawing at least one optical fiber having an azimuthal inhomogeneity, and applying to the fiber, during the drawing thereof, a coating having a non-circular cross-section. The azimuthal inhomogeneity of the fiber is positioned in a substantially constant orientation with respect to the non-circular cross-section of the coating. The drawn fiber or fibers may have a circular cross-section. If a plurality of fibers is drawn, the coating is applied such that the azimuthal inhomogeneity of each fiber in the coating is oriented in a substantially constant relationship with respect to the azimuthal inhomogeneities of the remaining fibers.

Another embodiment relates to a method of drawing an optical fiber comprising the steps of simultaneously drawing a pluraltiy of fibers, each having an azimuthal inhomogeneity. A plurality of such fibers can be drawn by supporting in a predetermined orientation a plurality of optical fiber preforms, each having an azimuthal inhomogeneity, and drawing fibers from the preforms. A coating is applied to the fibers during the drawing thereof. The azimuthal inhomogeneity of each fiber in the coating is oriented in a substantially constant relationship with respect to the azimuthal inhomogeneities of the remaining fibers. The coating can have a non-circular cross-section, in which case the azimuthal inhomogeneity of the fibers is positioned in a substantially constant orientation with respect to the non-circular cross-section of the coating along the length of the fibers.

The present invention also pertains to apparatus for forming a twist-free optical fiber cable. The apparatus comprises source means for supporting at least one source of softened thermoplastic material from which at least one optical fiber can be drawn by tractor means. Coater means located between the source means and the draw means applies a coating to the fiber. The coater means has a sizing orifice at the end thereof from which the coated fiber emerges. The apparatus is characterized in that the circumference of the sizing orifice has at least one flat region, whereby the coater means applies a coating having at leasts one surface that is sufficiently flat that the coating cannot twist in the draw means. For example, the sizing orifice may be rectangularly-shaped, thereby providing the coating with opposed, flat surfaces.

The method and apparatus of the present invention can produce a flexible fiber optic cable comprising at least one optical fiber having an azimuthal inhomogeneity, and a non-circular coating on the fiber. The azimuthal inhomogeneity of the fiber is positioned in a substantially constant orientation with respect to the non-circular cross-section of the coating. The fiber may have a circular cross-section.

The cable may comprise a plurality of optical fibers, each having an azimuthal inhomogeneity that is oriented in a substantially constant relationship with respect to the azimuthal inhomogeneities of the remaining of the fibers.

BRIEF DESCRIPTION OF THE DRAWINGS

FIG. 1 is a schematic illustration of an apparatus for drawing and coating twist-free optical fibers.

FIG. 2 is a cross-sectional view of a coater used in the apparatus of FIG. 21.

FIG. 3 is an enlarged cross-sectional view taken along lines 3—3 of FIG. 2.

FGIS. 4 and 5 are cross-sectional views illustrating tractors pulling optical fibers having flat and round coatings, respectively.

FIG. 6 is a cross-sectional view of an optical fiber preform that may be utilized in the method of the present invention.

FIG. 7 is a cross-sectional view of a coated optical fiber drawn from the preform of FIG. 6.

FIG. 8 is a cross-sectional view of a stress rod PRSM optical fiber.

FIG. 9 is a schematic illustration of an apparatus for drawing and coating a plurality of optcial fibers.

FIG. 10 is a cross-sectional view of coated optical fibers drawn by the apparatus of FIG. 9.

DESCRIPTION OF THE PREFERRED EMBODIMENTS

The drawings are not intended to indicate scale or relative proportions of the elements shown therein.

Referring to FIG. 1 there is shown an apparatus for drawing an optical fiber having substantially no rotation or twist along the longitudinal axis thereof. Fiber 10 is pulled by tractors 26 and 27 from preform 11, the tip of which is softened in furnace 12. Tractors 26,27 can be belts, capstans, pulleys or combinations thereof. The tractors must have one or more suitable contact surfaces that can engage one or more of the flat surfaces of a cable without imparting twist thereto. Conventional flat belts have been found to be satisfactory. Fiber 10 is drawn through a first coater 16 where a primary coating 17 is applied thereto. The primary coating is cured by passing it through means 18. The coated fiber is then drawn through a second coater 20 to apply over cured coating 19 a second coating 21 which is cured in means 22 to form outer coating 23. The curing means may be any suitable means for directing heat, UV light or the like onto the coated fiber, depending on the particular coating material that has been employed. After passing through tractors 26 and 27, the resultant flexible cable 28 is wound upon reel 29. Fiber diameter may be measured by any suitable means 13. A feedback signal from the diameter measurement means is conventionally used to control the speed of the tractors.

Fiber 10 can be drawn twist-free by applying thereto a coating that is sufficiently flat that cable 28 is prevented from twisting in tractors 26, 27. Coater 20, which is shown in greater detail in FIG. 2, is of the general type disclosed in U.S. Pat. No. 4,531,959. Situated in a vertically diposed bore in housing 32 are guide die 33, flow distribution sleeve 34 and sizing die 35. Tapered aperture 36 of guide die 33 facilitates the threading of the optical fiber into the coater. Tapered aperture 37 extends to the bottom of sizing die 35 to define a sizing orifice 38 which determines the size and shape of the applied coating. As shown in FIG. 3 orifice 38 is rectangularly shaped. During the fabrication of die 35, a conventionally shaped conical aperture was initially formed in a tungsten carbide cylinder, whereby the orifice at the small end of the taper was circular. The circular orifice was enlarged to rectangularly shaped orifice 38 by EDM machining.

Coating material flows through bores 41 into chamber 42 where it surrounds distribution sleeve 34, flows through feed holes 43 and onto the fiber being drawn through the coater.

The first coater sizing orifice need not be rectangularly shaped; it could be a conventional circularly shaped orifice, provided that the final coating is sufficiently flat to prevent cable 28 from twisting in the tractors. A flat coating could also be applied by employing a single coater or more than two coaters, depending upon the desired number of coatings. When urethane acrylate coating material is employed, it is conventional practice to apply two coatings, the second of which has a higher modulus than the first.

FIG. 4 shows that flattened coatings 19 and 23 are produced when coaters 16 and 20 have rectangularly-shaped sizing dies. As the coated fiber moves from the coater to the curing means, the uncured coating begins to flow, thereby changing the cross-sectional shape thereof from a rectangular shape to one having rounded corners as shown in FIG. 4. When conventional urethane acrylate coatings were drawn at at a sufficiently fast rate, the coatings were cured fast enough to preserve sufficiently flat opposing surfaces to prevent cable 28 from twisting in the tractors. For example, a draw speed of 4 to 5 m/sec was sufficiently fast for a spacing of about 20 cm between the coaters and the UV light curing means. Sufficiently flat coating surfaces could also be obtained by employing low viscosity coating materials such as gels or by employing extrusion coaters.

FIG. 5 illustrates the pulling of a conventional circular fiber optic cable 46 by tractors 26', 27'. Doubleheaded arrow 47 represents the back-and-forth twisting motion which randomly occurs during the drawing of such a cable.

The twist-free drawing of optical fibers taken in conjunction with the cross-sectional shape of the outer coating thereof renders the present method particularly useful for drawing optical fibers such as PRSM fibers which exhibit an azimuthal inhomogeneity which must be specifically oriented in the device in which the fiber is employed. FIG. 6 is a cross-sectional view of a preform from which such optical fibers can be drawn. Preform 50 comprises elliptical core 51 surrounded by cladding 52, the outer surface of which is circular in cross-section. The refractive index of core 51 is greater than that of cladding 52. Preform 50 could be formed by applying cladding glass particles to a core rod having an oblong cross-section, and thereafter consolidating the cladding glass particles. The core glass rod could be formed by any suitable process such as forming a cylinder of core glass, and removing from the cylinder two diametrically opposed longitudinally-extending surface sections by a suitable technique such as sawing, grinding or the like. U.S. Pat. No. 4,578,0987 teaches a method of forming a glass rod of oblong cross-section and a method of overcoating such a rod with cladding glass. Examples of other azimuthally inhomogenous preforms are taught in U.S. Pat. Nos. 4,415,230 and 4,395,270.

In PRSM fibers of the type disclosed herein, the orientation of the azimuthal inhomogeneity can be identified by reference to a major axis located in a plane that is transverse to the fiber axis. For example, major axis 53 in the transverse plane of FIG. 6 corresponds to the major axis of elliptical core 51. Minor axis 54 is perpendicular to axis 53.

When preform 50 is mounted in draw furnace 12 of FIG. 1, cable 56 of FIG. 7 can be drawn therefrom. PRSM fiber 57 is provided with an outer coating 58 having opposed flat surfaces 59 and 60 which are parallel to the minor axis 61 of fiber 57 throughout the length thereof. Fiber 57 could be drawn with its major axis parallel to surfaces 59 and 60 by rotating preform 50 90° in the draw furnace.

Our related U.S. patent application Ser. No. 361,383(now U.S. Pat. No. 4,932,740) teaches a method of making polarization maintaining couplers. When cable 56 is used in such a method, the technician can properly align the PRSM fibers by using the flat coating surfaces as a reference.

Optical fibers having azimuthal inhomogeneities can also be produced by a double crucible technique such as that taught in U.S. Pat. No. 4,385,916, wherein the orifice of the central crucible has an oblong shape.

FIG. 8 shows a "stress rod" PRSM optical fiber 65 of the type disclosed in U.S. Pat. No. 4,395,270, wherein core 66 may be circular in cross-section. Diametrically opposed, longitudinally-extending stress rods 67 and 68 having an expansion coefficient different from that of cladding 69. Such fibers can be drawn from preforms comprising a cladding glass tube in which there are placed a centrally-disposed core-containing glass rod, diametrically-opposed stress rods and cladding glass filler rods appropriately dispersed through the remaining interstices. Depending on the thermal expansion coefficient of the stress rod glass with respect to that of the cladding glass, core 66 will exhibit a greater value of refractive index along axis 70 than it does along axis 71. The major axis may be defined as that axis of the transverse plane which extends through the core in the direction of maximum refractive index, i.e. axis 70 in the above example.

A further embodiment of the invention is illustrated in FIG. 9 wherein elements similar to those of FIG. 1 are represented by primed reference numerals. Optical fibers 76 and 77 are drawn from preforms 78 and 79, respectively, the tips of which are softened in furnace 12'. Preforms 78 and 79 are fused to a common handle 80 which can be easily mounted in a vertically movable support mechanism 81. Fibers 76 and 77 are drawn through first and second coaters 16' and 20' to apply thereto primary and secondary coatings 17' and 21' as described in conjunction with FIG. 1. These coatings are cured in curing means 18' and 22', respectively. The resultant flexible cable 84, which is shown in cross-section in FIG. 10, is drawn through tractors and wound as illustrated in FIG. 1. To measure fiber diameter in this embodiment, a beam of coherent, monochromatic light from source 85 is directed radially onto fiber 76, and the resultant forward scattered pattern of interference fringes is detected and analyzed by device 86. The diameter of fiber 77 could also be measured, and the feedback signal could comprise a composite signal that depended upon the diameters of both fibers. Alternatively, a beam of light could be directed serially across both fibers, and the resultant shadow measured by a detecting device.

In this embodiment the fiber preforms are so constructed as to produce optical fibers having an azimuthal inhomogeneity, and the preforms are aligned such that the azimuthal inhomogeneities of the two fibers are oriented in a predetermined manner. Preforms 78 and 79 may have cross-sectional configurations as illustrated in FIG. 6. Depending upon the alignment of the major axes of the preforms, cable 84 may appear as shown in FIG. 10. The minor axes of fibers 76 and 77 are parallel to flat surfaces 88 and 89 of the outer coating 90. Thus, the azimuthal inhomogeneity of each fiber is aligned with respect to the azimuthal inhomogeneity of the other fiber in the cable, and it is aligned with respect to the noncircular cross-section of the outer coating.

Whereas fibers 76 and 77 both receive a primary coating in coater 16', these fibers could pass through separate primary coaters. The resultant separately coated fibers could pass through second coater 20' where a single flat coating is applied thereto.

EXAMPLE 1

A preform of the type illustrated in FIG. 6 was placed in a draw furnace. The elliptical core region consisted of $SiO_2$ doped with 30 wt. % $GeO_2$ and the cladding was pure $SiO_2$. A PRSM optical fiber having a diameter of 80 μm was drawn and coated by an apparatus of the type shown in FIG. 1, the coaters being of the type shown in FIGS. 2 and 3. The draw tractors were the belt-capstan wheel type disclosed in U.S. Pat. No. 4,755,021. A 14 cm length of coated fiber was gripped between a capstan wheel and a 2.5 cm wide rubber belt which was driven by a capstan motor spindie and spaced by two idler rolls. Fiber diameter was measured by an Anritsu fiber measurements system which provided a signal to the tractors to control the speed thereof. The fiber core size was 2 μm by 5.5 μm. The first coater had a round sizing die having a diameter of 0.127 mm (0.005 inch). The second coater had a rectangular sizing die, the dimensions of which were 0.229 mm (0.009 inch) by 0.457 mm (0.018 inch). The first coater was supplied with DeSoto brand low modulus urethane acrylate primary coating material, and the second coater was supplied with DeSoto brand high modulus urethane acrylate secondary coating material. The coating material was supplied to both coaters at room temperature. Ultra violet light curing means 18 and 22 were located 6 cm from coaters 16 and 20, respectively. Fiber draw rate was 6 m/sec. The resultant cable, which was similar to that shown in FIG. 7, had a maximum thickness of about 240 μm and a minimum thickness of about 180 μm. Opposed surfaces 59 and 60 were observed to be relatively flat. The cable was severed at various locations along its length in order to ascertain the orientation of the fiber core. Every inspection revealed that the minor axis of the PRSM fiber was parallel to the flat surfaces of the cable.

EXAMPLE 2

Apparatus similar to that described in Example 1 was employed for drawing a cable of the type shown in FIG. 10. The details of this method are the same as those described in Example 1 unless otherwise stated. Two preforms 78 and 79 of the type shown in FIG. 6 were fused to a glass handle 80 which was mounted in the vertically movable support mechanism of the furnace. The major axes of the core regions were parallel to one another. The diameter measuring system was oriented such that the axis of a beam of light from the source was located in the plane in which the axes of both fibers were disposed. The light beam was directed across both fibers, and the shadow activated the detector. Fibers 76 and 77 were drawn through first and second coaters to apply thereto primary and secondary coatings as described in Example 1. The first coater had a rectangular sizing die, the dimensions of which were 0.23 mm (0.009 inch) by 0.51 mm (0.02 inch). The second coater had a rectangular sizing die, the dimensions of which were 0.46 mm (0.018 inch) by 1.02 mm (0.04 inch).

The resultant flexible cable was similar to that shown in cross-section in FIG. 10. The cable was severed at various locations along its length in order to ascertain the orientations of the fiber cores. Every inspection revealed that the minor axes of the PRSM fibers were parallel to the flat surfaces of the cable.

We claim:

1. A flexible fiber optic cable comprising
   a plurality of polarization retaining single-mode optical fibers, each of said fibers having a core and cladding, the refractive index profile of each of said cores in a cross-section perpendicular to the fiber axis being such that said core exhibits a minimum refractive index along a minor axis in said cross-section and a maximum refractive index along a major axis in said cross-section, said major and minor axes being perpendicular to one another, said minor axes of said fiber cores lying in a given plane, and
   a protective coating on said fibers, said coating having opposed surfaces that are substantially flat, said plane being substantially parallel to said surfaces.

2. A flexible fiber optic cable in accordance with claim 1 wherein the core of each of said fibers is in the form of an ellipse.

3. A flexible fiber optic cable in accordance with claim 2 wherein said plurality of optical fibers have circular cross-sections.

4. A flexible fiber optic cable in accordance with claim 1 wherein each of said fibers further comprises two diametrically opposed, longitudinally-extending stress rods disposed in said cladding on opposite sides of said core, said stress rods having an expansion coefficient different from that of said cladding.

5. A flexible fiber optic cable in accordance with claim 4 wherein the minor axis of each of said cores passes through said stress rods.

6. A flexible fiber optic cable in accordance with claim 5 wherein said plurality of optical fibers have circular cross-sections.

7. A flexible fiber optic cable in accordance with claim 1 wherein said coating comprises a primary layer disposed on the surfaces of said fibers, and a secondary layer on the surface of said primary layer, said primary and secondary layers having opposed flat surfaces, the flat surfaces of said primary layer being parallel to the flat surfaces of said secondary layer.

8. A flexible fiber optic cable in accordance with claim 7 wherein the surfaces of said secondary layer that connect said opposed flat surfaces are rounded.

9. A flexible fiber optica cable in accordance with claim 8 wherein said plurality of optical fibers have circular cross-sections.

10. A flexible fiber optic cable comprising
    a plurality of polarization retaining single-mode optical fibers, the cross-sectional shape of the core of each of said fibers being in the form of and ellipse having a major axis and a minor axis, the minor axes of the cores of said fibers lying in a given plane, and
    a protective coating on said fibers, said coating having opposed surfaces that are not substantially flat, said plane being substantially parallel to said surfaces.

11. A flexible fiber optic cable in accordance with claim 10 wherein said coating comprises a primary layer disposed on the surfaces of said fibers, and a secondary layer on the surface of said primary layer, said primary and secondary layers having opposed flat surfaces, the flat surfaces of said primary layer being parallel to the flat surfaces of said secondary layer.

12. A flexible fiber optic cable in accordance with claim 11 wherein the surfaces of said secondary layer that connect said opposed flat surfaces are rounded.

13. A flexible fiber optic cable in accordance with claim 12 wherein said plurality of optical fibers have circular cross-sections.

* * * * *